United States Patent [19] [11] 4,053,453
McRowe et al. [45] Oct. 11, 1977

[54] VINYL HALIDE POLYMERS HAVING IMPROVED RESISTANCE TO BURNING AND SMOKE FORMATION

[75] Inventors: Arthur Watkins McRowe, Akron; William Joseph Kroenke, Brecksville, both of Ohio

[73] Assignee: The B. F. Goodrich Company, Akron, Ohio

[21] Appl. No.: 770,170

[22] Filed: Feb. 14, 1977

[51] Int. Cl.$^2$ .................. C08K 5/34; C08K 5/35; C08K 5/17
[52] U.S. Cl. .................. 260/45.75 C; 260/45.75 R
[58] Field of Search .................. 260/45.75 C, 45.75 R

[56] References Cited

U.S. PATENT DOCUMENTS

| 3,819,577 | 6/1974 | McRowe | 260/45.75 C |
| 3,821,151 | 6/1974 | Mitchell | 260/45.75 R |
| 3,845,001 | 10/1974 | Mitchell | 260/45.75 C |
| 3,956,231 | 5/1976 | Moore et al. | 260/45.75 R |
| 3,975,356 | 8/1976 | Dickens | 260/45.75 R |
| 3,992,480 | 11/1976 | Dorfman et al. | 260/45.75 C |

Primary Examiner—V.P. Hoke
Attorney, Agent, or Firm—J. Hughes Powell, Jr.; Charles A. Crehore

[57] ABSTRACT

Copper oxalate and amine molybdates provide an effective combination in vinyl halide polymer compositions to suppress smoke formation when vinyl halide polymers burn, without attendant adverse effects on the properties of the polymer compositions.

18 Claims, No Drawings

VINYL HALIDE POLYMERS HAVING IMPROVED RESISTANCE TO BURNING AND SMOKE FORMATION

BACKGROUND OF THE INVENTION

Vinyl halide polymer products have many structural applications useful in construction and transportation. Many uses are made of plasticized vinyl chloride polymers as in fabrics, upholstery, wall covering and the like where flame resistance and smoke formation could be a problem. Government and safety regulations relating to such materials are now in effect. Not only is flame resistance to be reduced in such materials as vinyl chloride plastic products, but smoke generated by vinyl chloride polymer products both in fires and in a smoldering state also must be reduced. There is need for improved plastic products which are safer in fire situations, even for vinyl chloride polymers which generally are considered to be flame resistant. A number of materials have been proposed and used in polyvinyl chloride for this purpose, but very few have been found to be completely satisfactory. Many are not compatible or readily mixed with vinyl chloride polymers, many are colored or form colored products in vinyl chloride polymer compositions and many have adverse effects on processing and the physical properties of vinyl chloride polymers.

U.S. Pat. Nos. 3,821,151 and 3,870,679 disclose the use of certain molybdenum compounds in PVC. The specific compounds listed suffer from the disadvantages that many such as commercially available $MoO_3$, are colored compounds giving an unsatisfactory pigmentation color to compositions in which they are used.

U.S. Pat. No. 3,845,001 discloses and claims the use of copper compounds such as $Cu_2O$ mixed with $MoO_3$ and reduced smoke production during combustion. This patent also states that "the applicability of such oxides suggests the use of other compounds" such as the salts of carboxylic acids as the acetates and butyrates and organo compounds such as copper carbonyl. While cuprous oxide and molybdenum oxide reduce the smoke produced during the combustion of polyvinyl chloride, other problems are introduced. $Cu_2O$ results in an undesirable red color in the compounds. The copper caboxylates that are suggested in U.S. Pat. No. 3,845,001 are generally unsatisfactory from other viewpoints than smoke reduction, for example, cupric formate during milling into polyvinyl chloride causes discoloration and black spots. This coloration problem is particularly acute with the tin sulfur stabilizers used widely throughout the industry. Further, copper formate, copper acetate and copper sulfide cause degradation of polyvinyl chloride.

SUMMARY OF THE INVENTION

Copper oxalate and amine molybdates such as melamine molybdate together are very effective fire and smoke retardants in vinyl polymer compositions such as vinyl chloride polymers and copolymers. The combinations are compatible and easily mixed with vinyl chloride polymers in both rigid and flexible forms, have no adverse effects on the physical properties or processing of the compounds, and provide synergistic reductions of smoke and decreased flame spread.

DETAILED DESCRIPTION

The copper oxalate and amine molybdates are normally used in powder form in amounts greater than about 0.1 part total per 100 weight parts of vinyl halide polymer, more preferably from about 1 to about 20 total weight parts per 100 weight parts of vinyl chloride polymers. From about 1 to 10 total weight parts is a very practical range providing a good balance of desirable properties in the compounds. The useful ratio of copper oxalate to amine molybdate is from about 1:10 to 10:1 on a weight basis. The copper oxalate and amine molybdate are readily mixed with the vinyl chloride polymers in powder form as is any other powder ingredient mixed with vinyl chloride polymers, masterbatched and the like, as is well known to those skilled in the art.

Cupric oxalate is readily prepared by mixing stoichiometric amounts of hot concentrated solutions of cupric sulfate and oxalic acid. The precipitate is filtered and may be dried in vacuum or at 100° C. and atmospheric pressure.

Amine molybdates are produced by reacting an amine with $MoO_3$, molybdic acid or a molybdenum salt such as ammonium molybdate, ammonium dimolybdate, ammonium heptamolybdate (also known as ammonium paramolybdate), ammonium octamolybdate, sodium molybdate or the like. Excellent results have been obtained using ammonium dimolybdate, ammonium heptamolybdate, sodium molybdate, and the commercial "molybdic acid" which primarily consists of one or more ammonium molybdates.

This reaction normally is conducted in the presence of water and preferably in the presence of an acid in order to maximize the amine molybdate yield in the aqueous reaction medium. Suitable acids include organic acids containing one to 12 carbon atoms such as acetic acid, propionic acid, benzoic acid, and the like; and inorganic acids such as hydrochloric acid, nitric acid, sulfuric acid and the like. Mixtures of acids may also be used.

Amines suitable for preparing the organoamine molybdates used in this invention may contain from 1 to 40 carbon atoms and from 1 to 10 primary, secondary or tertiary amine groups or a mixture thereof; more preferably from 1 to 20 carbon atoms and 1 to 4 primary amines or heterocyclic secondary amine groups. Examples of amines include aliphatic, alicyclic, aromatic and heterocyclic amines. Aliphatic amines include ethylamine, ethylenediamine, 1,2-propanediamine, 1,3-propanediamine, 1,4-butanediamine, 2-methyl-1,2-propanediamine, 1,5-pentanediamine, 1,6-hexanediamine, 1,7-heptanediamine, 1,8-octanediamine, 1,10-decanediamine, 1,12-dodecanediamine and the like. Also, aliphatic polyamines such as diethylenetriamine, triethylenetetramine, tetraethylenepentamine, bis(hexamethylene)triamine, 3,3'-iminobispropylamine, guanidine carbonate, and the like. Other suitable amines include alicyclic diamines and polyamines such as 1,2-diaminocyclohexane, 2',4-diamino-1-propyl-4-methylcyclohexane, and the like; aromatic amines as aniline, and naphthylamine; and heterocyclic amines such as melamine, N,N-dimethylaniline, pyridine, piperazine; hexamethylenetetraamine; 2,2,4-trimethyl decahydroquinoline; 2,4,6-tri(morpholino)-1,3,5-triazine; and N-(aminoalkyl)-piperazines wherein each alkyl group contains from 1 to 12 carbon atoms, more preferably 1 to 6 carbon atoms, such as N-(2-aminoethyl)piperazine, and the like. Examples of suitable polymeric amines include polyethyleneimine, polyvinylpyridine, polyvinylpyrrolidine, and poly(2,2,4-trimethyl-1,2-dihydroquinolyl). Excellent results are obtained using melamine, piperazine, and alkyl amines wherein the alkyl contains 1 to 8 carbon atoms.

Useful melamine and substituted melamines have the formula

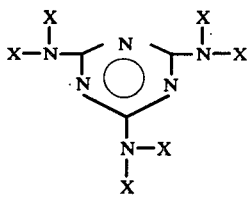

wherein X is hydrogen or an alkyl, alicyclic, aralkyl, alkaryl, aryl or heterocyclic group containing from 1 to 10 atoms of C, O, S and/or N. Two X's on each of one or more nitrogen atoms may also be joined together to form a heterocyclic ring such as a morpholino group in 2,4,6-tri(morpholino)-1,3,5-triazine. Other examples of suitable substituted melamines include N,N',N''-hexaethylmelamine; 2-anilino-4-(2',4'-dimethylanilino)-6-piperidino-1,3,5-triazine; and 2,4,6-tri(N-methylanilino)-1,3,5-triazine. The amine molybdate normally contains from about 1 to 2 moles of molybdenum per mole of amine.

The amine molybdates used in this invention may be in the form of polycrystalline or amorphous fine powders, preferably with an average particle size from about 0.01 to about 800 microns, more preferably from about 0.1 to about 200 microns, and even more preferably from about 0.5 to about 50 microns. Supports such as $SiO_2$, $Al_2O_3$ and the like may be used for the smoke retardant additives and in many cases are preferred, since additive surface area is greatly increased for smoke reduction purposes.

In a typical preparation of melamine molybdate, 10 grams of melamine was slurried with 150 ml of water and heated to 60° to 90° C.. 13.4 grams of 37% HCl was added to the slurry to dissolve the melamine. A hot solution of 28 grams of ammonium heptamolybdate dissolved in 50 ml of hot water was added to the melamine solution and the reaction mixture heated to reflux for 2 hours. After cooling at room temperature the white precipitate was filtered, washed 4 times with water and vacuum dried. The total yield of melamine molybdate of a molar ratio of 2 mols of molybdenum to 1 mol of melamine was 33.02 grams. Melamine molybdate with a molar ratio of 1 mol of molybdenum to 1 mol of melamine was similarly prepared with 10 grams of melamine dissolved in 250 ml of water and a solution formed by adding thereto 6.7 grams of 37% HCl solution. A solution of 14 grams of ammonium heptamolybdate was added to the melamine solution and after refluxing, the precipitate was recovered and dried for a total yield of 21.08 grams.

Piperazine molybdate is prepared as follows: 22.6 grams of piperazine hydrate, 22.9 grams of a 37 weight percent aqueous HCl solution, and 100 ml water were dissolved together and heated to reflux. 39.5 grams ammonium dimolybdate dissolved in 85 ml hot water was then added. A thick precipitate formed rapidly and the reaction mixture was refluxed for 20 minutes, cooled and filtered. The final product weighed 36.1 grams.

The vinyl halide polymers used in this invention include homopolymers, copolymers and blends of homopolymers and/or copolymers. Useful vinyl halides include vinyl chloride and vinylidene chloride polymers that contain up to about 50% by weight of at least one other olefinically unsaturated monomer, more preferably at least one other vinylidene monomer (i.e., a monomer containing at least one terminal $CH_2=C<$ group per molecule) copolymerized therewith, even more preferably up to about 20% by weight of such monomers. Suitable monomers include α-olefins containing from 2 to 12 carbon atoms, more preferably from 2 to 8 carbon atoms, such as ethylene, propylene, 1-butene, isobutylene, 1-hexene, 4-methyl-1-pentene and the like; dienes containing from 4 to 10 carbon atoms including conjugated dienes as butadiene, isoprene, piperylene and the like; ethylidene norbornene and dicyclopentadiene; vinyl esters and allyl esters such as vinyl acetate, vinyl chloroacetate, vinyl propionate, vinyl butyrate, vinyl laurate, vinyl benzoate, allyl acetate and the like; vinyl aromatics such as styrene, α-methyl styrene, chlorostyrene, vinyl toluene, vinyl naphthalene and the like; vinyl and allyl ethers and ketones such as vinyl methyl ether, allyl methyl ether, vinyl isobutyl ether, vinyl n-butyl ether, vinyl chloroethyl ether, methyl vinyl ketone and the like; vinyl nitriles such as acrylonitrile, methacrylonitrile and the like; cyanoalkyl acrylates such as α-cyanomethyl acrylate, the α-, β- and γ-cyanopropyl acrylates and the like; olefinically unsaturated carboxylic acids and esters thereof, including α,β-olefinically unsaturated acids and esters thereof such as acrylic acid, methacrylic acid, ethacrylic acid, methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethoxyethyl acrylate, hexylthioethyl acrylate, methylmethacrylate, ethyl methacrylate, butyl methacrylate, glycidyl methacrylate and the like wherein the alkyl groups contain 1 to 12 carbon atoms, and including esters of maleic and fumaric acid and the like; amides of the α,β-olefinically unsaturated carboxylic acids such as acrylamide, methacrylamide, and the like; divinyls, diacrylates and other polyfunctional monomers such as divinyl benzene, divinyl ether, diethylene glycol diacrylate, ethylene glycol dimethacrylate, methylene-bis-acrylamide, allyl pentaerythritol, and the like; and bis(β-haloalkyl) alkenyl phosphonates such as bis(β-chloroethyl) vinyl phosphonate and the like.

A group of particularly useful comonomers include 1-olefins containing from 2 to 8 carbon atoms; vinyl esters and allyl esters; olefinically unsaturated carboxylic acids and esters thereof, especially α,β-olefinically unsaturated acids and esters thereof; esters of maleic and fumaric acid and the like; amides of α,β-olefinically unsaturated carboxylic acids; and vinylidene or vinyl chloride.

Also included are chlorinated vinyl chloride and blends of vinyl and vinylidene chloride polymers and copolymers with other polymers, both plastics and elastomers, for example, with ABS resins, with 10 to 40% of copolymers of styrene and acrylonitrile or styrene and methyl methacrylate wherein styrene is the major component, elastomers containing about equal amounts of styrene and acrylonitrile with butadiene, polyurethanes, nitrile elastomers, both liquid and solid containing from about 15 to 40% acrylonitrile with the remainder butadiene, polyolefins and the like. These vinyl chloride polymers normally are high molecular weight polymers having a specific viscosity greater than 0.4 measured as a 0.4% solution in nitrobenzene.

The vinyl chloride and vinylidene chloride polymers may be prepared by any method known to the art such as by emulsion, suspension, bulk or solution polymerization. The additive compounds may be mixed with the polymer emulsion, suspension, solution or bulk mass before monomer recovery and/or drying. More preferably the compounds may be mixed with dry granular or powdered polymers. The polymers and compounds may be mixed thoroughly in granular or powder form in apparatus such as a Henschel mixer or the like. Alternatively, this step may be eliminated and the mixing done while the polymer mass is fluxed, fused and masticated to homogeneity under fairly intensive shear in or on a mixer apparatus having its metal surface in contact with the material. The fusion temperature and time will vary according to the polymer compositions and level of additive compounds but will generally be in the range of about 300° to 400° F. and 2 to 10 minutes.

The vinyl chloride polymers will be mixed with standard compounding ingredients known to those skilled in the art, plasticizers, lubricants, stabilizers, fillers, colorants, processing aids, other flame and smoke retardants, and the like. While these compounds are most effective in vinyl chloride polymers substantially free of plasticizers, they are also of value in reducing smoke formation of plasticized vinyl chloride polymers.

Smoke retardation may be measured using an NBS Smoke Chamber according to procedures described by Gross et al, "Method for Measuring Smoke from Burning Materials", *Symposium on Fire Test Methods — Restraint & Smoke* 1966, ASTM STP 422, pp. 166–204. Maximum smoke density ($D_m$) is a dimensionless number and has the advantage of representing a smoke density independent of chamber volume, specimen size or photometer path length, provided a consistent dimensional system is used. Maximum rate of smoke generation ($R_m$) is defined in units of min.$^{-1}$. Percent smoke reduction is calculated using this equation:

$$\frac{D_m/g \text{ of sample} - D_m/g \text{ of control}}{D_m/g \text{ of control}} \times 100$$

The term "$D_m/g$" means maximum smoke density per gram of sample. $D_m$ and other aspects of the physical optics of light transmission through smoke are discussed fully in the above ASTM publication.

In the following Examples, there is reported the $D_m/g$, maximum optical density/gram of sample observed with a vertical light path in the National Bureau of Smoke Chamber (NBS) and % smoke reduction. $D_m$ is maximum optical density according to Gross. The NBS smoke chamber and its use are described by Gross et al in fire test methods ASTM STP 422, 1967, Pages 166–206. The NBS $D_m/g$ smoke numbers reported are in the flaming or nonflaming mode.

EXAMPLE I

To demonstrate the practice of the invention and the unexpected synergistic reduction in smoke formation obtained with the combination of copper oxalate and melamine molybdate, varying amounts of these two materials were used in the following standard compound: 100 weight parts of polyvinyl chloride having a specific viscosity of 0.38–0.42 in nitrobenzene at 30° C. was dry mixed with 2 weight parts of dibutyltin bisisooctyl thioglycolate, 4 weight parts of a processing aid of a copolymer of a major proportion of methyl methacrylate and lesser amounts of ethyl acrylate, 3.0 weight parts of titanium dioxide, 1.0 weight part of calcium stearate and 1.0 weight part of ethylenebis stearamide. The powder mixture was placed on a heated 10 inch 2-roll mill and formed into sheets which were cut into predetermined size samples. To these samples there was then added on a mill the amounts of copper oxalate and melamine molybdate in a mol ratio of 2 moles of Mo to 1 mole of melamine indicated in the tables below. 6×6×0.025 inch ACS test pieces were pressed at 320° F. for 3 minutes to 25± mil sheets. 3 × 3 inch samples were tested in the NBS smoke chamber in the flaming mode. The test results in the tables are averages of several runs and the data is NBS Smoke Chamber flaming mode data. The copper oxalate/melamine molybdate combination is particularly useful and valuable in synergistically providing reduced smoke formation in burning vinyl chloride polymer compositions. This combination does not form objectionable color reaction products with standard tin-sulfur stabilizers.

TABLE I

| | Weight Parts | | Sample | | | % Smoke |
|---|---|---|---|---|---|---|
| Run | Copper Oxalate | Melamine Molybdate | Weight grams | thickness mils | $D_m/g$ | Reduction |
| 1 | 0 | 0 | 5.18 | 27.1 | 55.94 | — |
| 2 | 0 | 2.5 | 5.84 | 29.5 | 28.31 | 49.39 |
| 3 | 0 | 5.0 | 5.63 | 28.3 | 27.05 | 51.65 |
| 4 | 0 | 10.0 | 5.57 | 27.7 | 25.72 | 54.02 |
| 5 | 2.5 | 0 | 4.95 | 25.2 | 29.30 | 47.60 |
| 6 | 5 | 0 | 5.81 | 29.7 | 26.04 | 53.43 |
| 7 | 10 | 0 | 6.08 | 30.2 | 19.138 | 65.78 |
| 8 | 1.25 | 1.25 | 5.53 | 27.3 | 19.03 | 65.97 |
| 9 | 2.5 | 2.5 | 5.64 | 28.3 | 13.96 | 75.05 |
| 10 | 2.5 | 2.5 | 5.63 | 30.7 | 12.91 | 76.92 |
| 11 | 1 | 4.0 | 6.11 | 30.7 | 15.48 | 72.31 |
| 12 | 1.80 | 3.20 | 5.98 | 29.5 | 12.51 | 77.62 |
| 13 | 3.20 | 1.80 | 6.54 | 32.5 | 13.86 | 75.22 |
| 14 | 5.0 | 5.0 | 5.99 | 29.0 | 12.38 | 77.87 |
| 15 | 7.0 | 3.0 | 6.16 | 29.7 | 11.75 | 78.99 |

EXAMPLE II

Another series of polymers were prepared as described and tested in the nonflaming mode. The results obtained are set forth in Table II below. Many flame and smoke retarders that have utility in the flaming mode, often cause increased smoke in the nonflaming mode. This is not the case with the novel combinations of this invention. The data is NBS Smoke Chamber nonflaming mode data.

TABLE II

| | Weight Parts | | Sample | | | % |
|---|---|---|---|---|---|---|
| Run | Copper Oxalate | Melamine Molybdate | weight grams | thickness mils | Dm/g | Smoke Reduction |
| 1 | 0.0 | 0.0 | 5.0 | 23.0 | 22.30 | — |
| 2 | 0.0 | 10.0 | 5.64 | 27.0 | 19.37 | 13.14 |
| 3 | 0.0 | 5.0 | 5.55 | 27.5 | 22.95 | 2.91 increase |
| 4 | 2.50 | 2.50 | 5.72 | 28.0 | 10.95 | 50.89 |
| 5 | 1.0 | 4.0 | 5.39 | 26.5 | 11.94 | 46.47 |
| 6 | 1.80 | 3.20 | 6.09 | 31.5 | 10.89 | 51.18 |
| 7 | 3.20 | 1.80 | 6.62 | 32.5 | 12.51 | 43.89 |
| 8 | 1.25 | 1.25 | 6.24 | 31.0 | 11.37 | 49.02 |
| 9 | 3.0 | 7.0 | 6.23 | 29.5 | 10.52 | 52.81 |
| 10 | 5.0 | 5.0 | 6.14 | 29.5 | 10.98 | 50.75 |
| 11 | 7.0 | 3.0 | 6.1 | 30.0 | 9.57 | 57.07 |
| 12 | 5.0 | — | 5.74 | 25.5 | 16.28 | 27.01 |
| 13 | 10.0 | — | 6.52 | 29.0 | 12.76 | 42.79 |

The performance of these novel smoke retardant combinations was also determined in rigid polyvinyl chloride sheets in an ASTM E-84 tunnel test. The standard compounds were both calendered and extruded. The calender sheets were mounted on asbestos board.

The extruded sheets were mounted on asbestos board, and a control not containing the copper oxalate/melamine molybdate was also mounted on asbestos board. Excellent results were obtained with both calendered and extruded sheets. These articles containing both 2.5 and 5 weight parts per 100 of polyvinyl chloride of 50/50 copper oxalate/melamine molybdate had a 30 to 55% reduction in flame rating and 92 to 97% reduction in smoke rating.

Mixtures of copper oxalate and amine molybdate in varying amounts of from 1 to 10 total weight parts in a test for dynamic thermal stability in an internal mixer show no substantive increase in torque or decrease in decomposition time during processing.

EXAMPLE III

When molybdenum trioxide is substituted for the melamine molybdate in combination with the copper oxalate in the above compound, no practical synergism is noted with this combination. For example, in the flaming mode NBS smoke test $D_m g$ values of about 23 (58.8% smoke reduction relative to the standard compound of Example I) were obtained with ratios of 1.0 molybdenum oxide and 4.0 copper oxalate, 2.0 molybdenum oxide and 3.0 copper oxalate, 3.0 molybdenum oxide and 2.0 copper oxalate, 4.0 molybdenum oxide and 1.0 copper oxalate. In contrast, it should be noted that when 1.0 copper oxalate and 4.0 melamine molybdate were used in the same compound the $D_m/g$ was 19.08 with a smoke reduction of 65.1%, and with 4.0 copper oxalate and 1.0 melamine molybdate the $D_m g$ was 19.92 and a 64.38% smoke reduction.

EXAMPLE IV

The effectiveness of the novel combination of copper oxalate/melamine molybdate in plasticized vinyl chloride compositions is demonstrated in this Example. With 100 weight parts of polyvinyl chloride of the polyvinyl chloride of Example I there was mixed 2 weight parts of a barium, cadmium, zinc fatty acid salt stabilizer (Interstab BC 328), dioctylphthalate (DOP), and a 50:50 mixture of cupric oxalate and melamine molybdate in the amounts set forth in the table below. The values obtained were in the flaming mode NBS smoke test.

TABLE III

| DOP | Cupric Oxalate/<br>Melamine Molybdate<br>(phr of 1/1 mixture) | $D_m/g$ |
| --- | --- | --- |
| 14 | — | 64.8 |
| 14 | 5 | 20.3 |
| 20 | — | 68.0 |
| 20 | 5 | 26.9 |
| 40 | — | 65.2 |
| 40 | 5 | 35.9 |
| 60 | — | 72.4 |
| 60 | 5 | 42.7 |
| 80 | — | 75.4 |
| 80 | 5 | 60.2 |

EXAMPLE V

To demonstrate the utility of other amine molybdates, a series of compounds were prepared using 2.5 weight parts of copper oxalate and 2.5 weight parts of the amine molybdate in polyvinyl chloride compound containing 100 weight parts of the PVC of Example I, 2 weight parts of polyethylene and 2 weight parts of dibutyltinbis-isooctyl thioglycolate. Controls containing (1) 5 weight parts of copper oxalate, (2) 5 weight parts of amine molybdate and (3) neither were also prepared for comparison purposes. The results obtained, in terms of maximum smoke density and percent smoke reduction are set forth in the data table below.

TABLE IV

| Run No. | Amine Molybdate (phr) | | Copper Oxalate (phr) | Maximum Smoke Density - $D_m/g$ | % Smoke Reduction |
| --- | --- | --- | --- | --- | --- |
| 1 | Control | | 0 | 52.87 | — |
| 2 | — | 0 | 5 | 20.27 | 62 |
| 3 | Ethylamine molybdate | 5 | 0 | 34.11 | 35 |
| 4 | Ethylamine molybdate | 2.5 | 2.5 | 13.83 | 74 |
| 5 | Piperazine molybdate | 5 | 0 | 24.77 | 53 |
| 6 | Piperazine molybdate | 2.5 | 2.5 | 15.24 | 71 |
| 7 | Control | | 0 | 54.78 | — |
| 8 | — | 0 | 5 | 17.76 | 68 |
| 9 | Guanidine molybdate | 5 | 0 | 29.98 | 45 |
| 10 | Guanidine molybdate | 2.5 | 2.5 | 12.16 | 78 |
| 11 | Aniline molybdate | 5 | 0 | 26.16 | 52 |
| 12 | Aniline molybdate | 2.5 | 2.5 | 15.59 | 72 |
| 13 | 2,2,4-trimethyldeca-hydroquinoline | 5 | 0 | 30.01 | 45 |
| 14 | 2,2,4-trimethyldeca-hydroquinoline | 2.5 | 2.5 | 16.07 | 71 |
| 15 | Pyridine molybdate | 5 | 0 | 30.04 | 45 |
| 16 | Pyridine molybdate | 2.5 | 2.5 | 14.75 | 73 |
| 17 | Hexamethylmelamine molybdate | 5 | 0 | 22.38 | 59 |
| 18 | Hexaethylmelamine molybdate | 2.5 | 2.5 | 13.34 | 76 |

We claim:

1. A composition comprising a vinyl halide polymer and smoke retardant amounts of copper oxalate and an amine molybdate.

2. A composition of claim 1 wherein said vinyl halide polymer is a vinyl chloride polymer containing from about 0 to 50 weight percent of at least one other olefinically unsaturated monomer.

3. A composition of claim 2 wherein said copper oxlate and amine molybdate are present in amount from about 0.1 to about 20 total weight parts per 100 weight parts of vinyl polymer.

4. A composition of claim 3 wherein said amine contains from 1 to 40 carbon atoms and from 1 to 10 primary, secondary or tertiary amine groups.

5. A composition of claim 4 wherein said amine molybdate is a heterocyclic amine molybdate.

6. A composition of claim 5 wherein said heterocyclic amine is melamine or substituted melamine having the formula

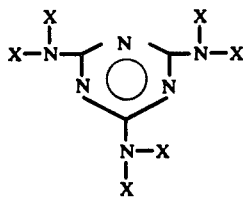

X being hydrogen or an alkyl, alicyclic, aralkyl, alkaryl, aryl or heterocyclic group containing from 1 to 10 atoms of carbon, oxygen, sulfur and/or nitrogen, and with two X's on each of one or more nitrogen atoms optionally being joined together to form a heterocyclic ring.

7. A composition of claim 6 wherein the amine is melamine molybdate.

8. A composition of claim 7 wherein cupric oxalate and melamine molybdate are present in amount from about 1 to 10 weight parts each per 100 weight parts of polymer.

9. A composition of claim 4 wherein said amine is an alkyl amine wherein the alkyl contains 1 to 8 carbon atoms.

10. A composition of claim 4 wherein said amine is piperazine.

11. A composition of claim 8 wherein said vinyl chloride polymer is poly(vinyl chloride).

12. A composition of claim 4 wherein said amine is guanidine.

13. A composition of claim 4 wherein said amine is aniline.

14. A composition of claim 4 wherein said amine is 2,2,4-trimethyldecahydroquinoline.

15. A composition of claim 4 wherein said amine is pyridine.

16. A composition of claim 4 wherein said amine is hexaethyl melamine.

17. A composition of claim 9 wherein said amine is ethylamine.

18. A composition of claim 17 wherein said vinyl chloride polymer is poly(vinyl chloride).